United States Patent [19]

Soucie et al.

[11] Patent Number: 4,762,726

[45] Date of Patent: Aug. 9, 1988

[54] SHELF STABLE ACID FOOD DRESSINGS CONTAINING FIBROUS PROTEIN COMPLEXES

[75] Inventors: William G. Soucie, Gurnee; Wen-Sherng Chen, Glenview; Vernon C. Witte, Naperville; George A. Henry, Wilmette; W. Dennis Drehkoff, Glencoe, all of Ill.

[73] Assignee: Kraft, Inc., Glenview, Ill.

[21] Appl. No.: 24,507

[22] PCT Filed: Jul. 1, 1985

[86] PCT No.: PCT/US85/01265

§ 371 Date: Mar. 1, 1987

§ 102(e) Date: Mar. 1, 1987

[87] PCT Pub. No.: WO87/00009

PCT Pub. Date: Jan. 15, 1987

Related U.S. Application Data

[63] Continuation-in-part of Ser. No. 567,096, Dec. 30, 1983, Pat. No. 4,563,360, and Ser. No. 567,277, Dec. 30, 1983, Pat. No. 4,559,233.

[51] Int. Cl.$^4$ .............................................. A23L 1/24

[52] U.S. Cl. ................................. 426/602; 426/605; 426/613; 426/330; 426/330.6; 426/589; 426/574; 426/656

[58] Field of Search ............... 426/602, 613, 321, 330, 426/330.6, 589, 574, 104, 650, 605

[56] References Cited

U.S. PATENT DOCUMENTS

| | | | |
|---|---|---|---|
| 4,278,692 | 7/1981 | Cassanelli | 426/602 |
| 4,352,832 | 10/1982 | Wood | 426/330 |
| 4,447,461 | 5/1984 | Loos et al. | 426/574 |
| 4,559,233 | 12/1985 | Chen | 426/104 |
| 4,563,360 | 1/1986 | Soucie et al. | 426/574 |
| 4,596,715 | 6/1986 | Ballard | 426/613 |
| 4,615,899 | 10/1986 | Hunter | 426/574 |

*Primary Examiner*—Jeanette Hunter
*Attorney, Agent, or Firm*—Fitch, Even, Tabin & Flannery

[57] ABSTRACT

Shelf-stable acidic food dressings having a pH of less than 4.1 comprising an acidic food dressing vehicle and fibrous xanthan gum-protein complexes which retain their firm fibrous texture under prolonged storage conditions. Also disclosed are methods for preparing dressings.

6 Claims, 2 Drawing Sheets

SHELF STABLE ACID FOOD DRESSINGS CONTAINING FIBROUS PROTEIN COMPLEXES

This application is a continuation-in-part of to U.S. application Ser. No. 567,096 and U.S. application Ser. No. 567,277 now U.S. Pat. No. 4,559,233, both filed Dec. 30, 1983.

The present invention is directed to shelf stable acidified fluid food dressings which contain texturally firm protein complex fibers such as meat analog fiber compositions. More particularly, the present invention is directed to acidified, emulsified oil dressings and oil-free dressings and the like which contain fibrous xanthan-protein complexes and which are shelf stable at room temperature.

Substantial technological effort has been directed to the development of acidic food dressings which are microbiologically stable, and such dressings are conventionally prepared which remain wholesome and have a shelf life at room temperature for at least 6 months or more. Such acidic food dressings may generally comprise sufficient acid content to have an aqueous phase pH of less than about 4.1, typically from about 2.75 to 3.75, in order to provide microbiological stability at room temperature, together with a tart or acidic flavor profile. In this regard, for example, U.S. Pat. No. 3,955,010 to Chozianin, et al., and U.S. Pat. 4,145,451 to Oles describe shelf stable acidic food dressings which remain preserved against spoilage for extended time periods.

It would be desirable to provide shelf-stable acidic food dressings which contain firm-textured meat pieces such as shrimp or diced chicken as a flavor and texture enhancing component. However, because of the acidic nature of such food dressings, the texture, firmness and fibrous quality of such meat proteins tend to degrade upon prolonged storage. Natural meat pieces also may present difficulties in the preservation of microbiological stability under prolonged storage, and tend to buffer the acid content of the dressing.

Accordingly, it is an object of the present invention to provide shelf-stable acidic food dressings containing fibrous protein compositions which retain their firmness and fibrous textural properties in the acid environment of the food dressing. It is a further object to provide methods for the manufacture of protein complex fibers and food dressings which have desirable flavor and texture characteristics. It is a further object to provide novel meat-simulating protein compositions which may be utilized in acidic food dressings. These and other objects of the invention will become apparent from the following detailed description and the accompanying drawings of which:

Generally, the present invention is directed to shelf stable acidic food dressings comprising a blend of an acidic aqueous fluid food dressing vehicle having a pH of less than about 4.1 and a firm-bodied xanthan gum-protein fiber complex composition which retains its fibrous form and texture in the acidic food dressing vehicle. The shelf-stable food composition will generally comprise from about 0.25 to about 50 percent by weight, and preferably from about 1 to about 10 percent by weight of the xanthan gum-protein fiber composition, and from about 50 percent to about 99.75 percent by weight, and preferably from about 90 percent to about 99 percent by weight of the aqueous fluid food dressing vehicle, based on the total weight of the food dressing.

The food dressing vehicle utilized in accordance with the present invention will generally contain from about 20 to about 96 percent by weight of water, and sufficient acidifying agent to provide the aqueous component of the dressing vehicle with a pH of less than 4.1, and preferably in the range of from about 2.75 to about 3.75. On accordance with conventional food dressing manufacture, depending on the desired pH, the amount of water in the dressing vehicle and the effect of additional components of the food dressing, the acidifying agent will generally be present in an amount of from about .1 to about 3.5 weight percent based on the total weight of the food dressing vehicle.

Also in accordance with conventional acid dressing manufacture, the food dressing vehicle may contain up to about 20 weight percent of a bodying agent such as gums, starch or other hydrocolloids and mixtures thereof, from about 0 to about 5 percent salt, from about 0 to about 30 percent sweetener, and from about 0 to about 15 percent spices and flavors, based on the total weight of the food dressing vehicle. The food dressing vehicle which may be utilized includes oils or oil-less dressings, pourable or viscous dressings and emulsified or nonemulsified food dressing products commonly used as an adjunct on salads, vegetables, sandwiches and the like. Included within such classification are products such as mayonnaise, salad dressing and French dressing, and imitations thereof, as well as low calorie oil-less products, including condiments or reduced calorie products, and other emulsified and nonemulsified oil-containing products. A typical acidic, fluid high oil-containing dressing for salads, which may be either pourable or semisolid, might have the following composition with percentage values of acetic acid and phosphoric acid expressed as weight percent of the moisture present in the composition, but other ingredients expressed as weight percent of the total composition:

| Ingredient | Weight Percent Range | Specific Example |
| --- | --- | --- |
| Oil | 30–60 | 50.0 |
| Moisture | 20–50 | 38.65 |
| Egg Yolk | 0–8 | 4.0 |
| Sweetener | 0.4 | 2.0 |

-continued

| Ingredient | Weight Percent | |
|---|---|---|
| | Range | Specific Example |
| Salt | 0–4 | 1.5 |
| Starch | 0–4 | 0.0 |
| Gum | 0–1.5 | 0.75 |
| Spices and Flavors | 0–5 | 2.0 |
| Acetic Acid | 0.05–1.8 | 1.0 |
| Phosphoric Acid | 0.1–1.5 | 0.1 |

A typical acidic, fluid low oil-containing dressing for salad, which may be either pourable or semisolid, might have the following composition with percentage value of acetic acid and phosphoric acid expressed as weight percent of the moisture present in the composition, but other ingredients expressed as weight percent of the total composition:

| Ingredient | Weight Percent | |
|---|---|---|
| | Range | Specific Example |
| Oil | 10–15 | 10.0 |
| Moisture | 35–90 | 64.5 |
| Sweetener | 0–10 | 8.0 |
| Egg Yolk | 0–7 | 4.0 |
| Salt | 0–4 | 2.0 |
| Starch | 0–10 | 6.0 |
| Gum | 0–11 | 1.5 |
| Spices and Flavors | 0–5 | 2.8 |
| Acetic Acid | 0.05–1.8 | 1.0 |
| Phosphoric Acid | 0.1–1.5 | 0.2 |

A typical oil-less dressing, for example, for condiments, might have the following composition with percentage values of acetic acid and phosphoric acid expressed as weight percent of the moisture present in the composition, but other ingredients expressed as weight percent of the total composition:

| Ingredient | Weight Percent | |
|---|---|---|
| | Range | Specific Example |
| Oil | 1.5 | 1.0 |
| Moisture | 55–96 | 65.3 |
| Egg Yolk | 0–20 | 5.0 |
| MSNF | 0–15 | 5.0 |
| Sweetener | 0–30 | 10.0 |
| Salt | 0–5 | 2.0 |
| Gum | 0–15 | 1.5 |
| Starch | 0–20 | 6.0 |
| Spices and Flavors | 0–15 | 3.0 |
| Acetic Acid | 0.05–1.8 | 1.0 |
| Phosphoric Acid | 0.1–1.5 | 0.2 |

These formulations are presented by way of example only and other formulations for dressings for salad are well known in the art. Similarly, techniques for the manufacture of dressing products of the types described herein are well known and within the skill of the art.

The ingredients that are utilized in food dressing compositions are also well known. The oil may be any of the well known edible triglyceride oils derived from oil seeds, for example, corn oil, soybean oil, safflower oil, cottonseed oil, etc., or mixtures thereof. The sweetener used is typically sucrose. However, other sweeteners such as dextrose, fructose, corn syrup solids and synthetic sweeteners may also be utilized.

Any suitable emulsifying agent may be used in the salad dressing compositions of the invention. In this connection, egg yolk solids, protein, gum arabic, carob bean gum, guar gum, gum karaya, gum tragacanth, carrageenan, pectin, propylene glycol esters of alginic acid, sodium carboxymethyl-cellulose, polysorbates and mixtures thereof may be used as emulsifying agents in accordance with conventional food dressing manufacturing practices. The use of emulsifying agents is optional and depends upon the particular type of emulsified oil being prepared. Emulsifying agents, when used, may typically be present at levels of from about 1 percent to about 10 percent, depending on the particular emulsifying agent used.

A bodying agent may be used in the food dressing vehicle to provide desired body or viscosity in accordance with conventional practice. The bodying agent may be a starch paste or may comprise an edible gum such as xanthan gum, guar gum, propylene glycol ester of alginic acid (hereinafter "PGA") or the like. Starch, if used, may typically be present at a level of from about 2 percent to about 10 percent. The edible gum will typically be present at lower levels to provide desired body and texture.

Starch paste is generally used as a bodying agent in the preparation of semisolid emulsified oil dressings, such as salad dressing, and may be used in the preparation of pourable emulsified oil dressings, such as French dressing. The starch may be utilized at a level of from about 1 to about 8 percent by weight in semisolid dressings and at a level of from 0 percent to about 8 percent in pourable dressings. Any suitable starch containing material may be used, and in this connection, any food starch, whether modified, unmodified or pregelatinized, tapioca flour, potato flour, wheat flour, rye flour, rice flour or mixtures thereof may be used as a bodying agent in the preparation of food dressing vehicles. Similarly, the bodying agent may comprise edible gums individually or in combination, and the gums will usually provide the desired body and texture at levels below those normally required when starch paste is used. The gums, when used as a bodying agent, may typically be present at a level of between about 0.25 percent and 2.5 percent. Various other ingredients, such as spices and other flavoring agents, and preservatives such as sorbic acid (including salts thereof) may also be included in effective amounts.

As previously indicated, the dressing vehicle has an aqueous pH of about 4.1 or lower, preferably in the range of from about 2.75 to about 3.75. Any suitable edible acid or mixture of acid may be used to provide the required level of acidity in the emulsified dressing compositions of the invention. Suitable edible acids include lactic acid, citric acid, phosphoric acid, hydrochloric acid, and acetic acid and mixtures thereof. Mixtures of acetic acid and phosphoric acid are particularly preferred acidifying agents. The amount utilized to achieve a desired pH will depend on a variety of factors known in the art including the buffering capacity of protein components of the dressing.

As also indicated, xanthan gum-protein fiber complex compositions are an important component of the food dressings of the present invention. Such fibrous complexes will generally comprise from about 20 to about 85 percent water, and from about 5 to about 75 percent fibrously complexed xanthan gum and protein. The fibrous complexes may further include additional components incorporated in the fibrous structure of the complex, such as from about 0 to about 40 weight percent of edible oil, and from about 0 to about 50 weight percent of carbohydrate based on the total weight of the fiber composition. The fiber compositions may further include a flavoring agent, which may generally be used at a level of from about 0 to about 5 percent by weight, and may include pieces of natural meat fibers as a flavoring component. The fibers may be incorporated directly in the food dressing vehicle, or more preferably will be heat set in a fiber agglomerate form, with or without a suitable binder, which may be diced prior to introduction into the food dressing vehicle. The fiber composition will desirably be formed into fiber agglomerates having a mass of less than about 2 grams, and more preferably from about 0.02 grams to about 1.5 grams. Fiber agglomerates may be formed by pressing the fibers, with or without a binding agent, to form a knitted fiber mass. The fiber composition may be dried to have a lower water content, but such dried fiber compositions will absorb water upon combination with the food dressing vehicle.

Such fibers may be prepared by providing an aqueous protein fiber generating solution comprising a suitable solubilized edible protein polymer component or mixtures of protein polymer components having an isoelectric point greater than pH 3. Suitable proteins include vegetable proteins such as legume proteins and cereal proteins and animal proteins such as dairy proteins and egg proteins. Suitable vegetable proteins include soy protein, peanut proteing and oilseed protein such as cottonseed protein, faba bean protein and sunflower seed protein. Suitable dairy proteins include casein and whey protein. Suitable egg proteins include egg white protein and defatted egg yolk protein. While vegetable protein isolates such as soy protein isolate, cottonseed protein isolate, peanut protein isolate, faba bean protein isolate, sunflower protein isolate and pea protein isolates are preferred protein components, xanthan-protein complex fibers may be prepared from less refined, or unrefined protein sources. For example, finely divided natural vegetable seed and bean protein sources such as soy meal, ground whole soybean, soy milk, and cottonseed flour may be utilized as protein sources in the fiber generating solution. Soy protein isolate, mixtures of soy protein isolate and egg albumin, and mixtures of soy protein isolates and whey protein are particularly preferred edible protein polymer components. By "solubilized protein" is meant a protein that is hydrated by existing either in true solution (single phase) or in a stabilized dispersion which upon initial dispersion in water may appear to be a single phase but after a period of time may separate into two phases. The edible protein polymer component(s) will desirably have an isoelectric point(s) greater than about 3, preferably in the range of from about 4 to about 12. Particularly useful proteins may have an isoelectric point in the range of from about 4 to about 7. In this regard, typically soy protein isolate may have an isoelectric point of about 4.5, egg albumin of about 4.7 and casein of about 4.5. It is noted that various constituents of the solubilized edible protein component may have different isoelectric points.

The protein components are desirably solubilized at a pH of at least about 1 pH unit and preferably at least about 2 pH units from their isoelectric points. By a "protein isolate" is meant a protein preparation containing about 90% protein. The fiber generating solution further includes a solubilized xanthan gum hydrocolloid polymer component selected from the group consisting of xanthan gum, xanthan gum/hydrocolloid adducts and mixtures thereof. By "xanthan gum" is meant the heteropolysaccharide produced by fermentation of the microorganism of the genus Xanthomonas. A discussion of the physical and chemical properties may be found in Industrial Gums, R. L. Whistler, Ed., Academic Press, N.Y. (1973), p. 473. Xanthan gum forms adducts with other hydrocolloids such as carob gum in which it is believed that the extended linear nature of the xanthan gum in solution is preserved. Desirably, the xanthan gum adducts should comprise at least about 60 weight percent of xanthan gum, based on the total weight of the xanthan gum and the adduct component.

The fiber generating solution may be provided in any suitable manner, as by preparing and subsequently combining separate protein components and xanthan gum polymer solutions, and by initially preparing a solution comprising both components. The fiber generating solution should best contain a solubilized protein component and xanthan component in a particular range, and in this regard, the total solubilized protein and xanthan components may be in the range of from about 0.1 weight percent to about 4 weight percent, based on the total weight of the aqueous fiber generating solution.

The aqueous fiber forming solution may further include other components, including other dissolved or suspended protein components, flavoring agents, carbohydrates, emulsified or suspended oils or fats, preservatives and hydrocolloids. Such additional materials should not be included in amounts which prevent fiber formation, or which produce fibers which are unsuited for the intended purpose. When utilizing unrefined or partially refined protein sources such as bean or seed meals, the fiber generating solution will include substantial quantities of nonprotein components such as carbohydrates and fats or oils derived from the source of the protein. For example, soy meal may typically contain about 40 percent protein, about 20 percent oil, and about 35 percent carbohydrate, while defatted cottonseed meal (moisture about 10 percent) may typically contain 53 percent protein and 27 percent carbohydrate, based on the total weight of the meal. Carbohydrates, such as corn starch, and edible fats and oils, particularly in emulsified form, may also be incorporated in the fiber forming solution. Fats and oils may desirably be incorporated in the fiber forming solution at levels of up to 70 weight percent, based on the total weight of the protein. Desirably, the carbohydrate to protein weight ratio in the fiber forming solution should best not exceed about 7 to about 1 and more preferably about 4 to about 1.

For example, soy-xanthan complex fibers of moderate textural properties may be prepared from blends of soy meal naturally containing about 35 weight percent protein and about 32 weight percent carbohydrate, with ground corn starch in up to 2:1 weight ratio of corn starch to soy flour, but increasing the weight ratio to 3:1 or more produces weak fibers. Because fiber forming capacity of different proteins with xanthan gum differs, the ability to tolerate additives may depend on the protein component and will generally be at least in part a function of the protein(s) utilized in the fiber forming solution.

To form fibers, the pH of the fiber generating solution may be adjusted to a pH at which the components form a complex, which is preferably within about 2 pH units of an optimum isoelectric pH for the desired complex, to form a fibrous protein-xanthan complex under conditions of mixing of the fiber forming solution. In this manner, hybrid protein complexes may be formed which have a fibrous-meat like texture. The fiber formation is spontaneous and does not require the use of spinning equipment. Once the fibers are formed, they are relatively stable to a range of salt and pH conditions. Moreover, the fibrous network syner­eses to produce fibers having a lower water content than the fiber forming solution. The fibers under some conditions may be less dense than the aqueous phase and thus float to the surface for harvesting by skimming the surface of the reaction vessel or draining away the aqueous phase from below such as in a standard cheese vat. The separation of the fibrous hybrid protein complexes from the liquid phase, which may contain low molecular weight solutes, effectively removes salts from the protein-complex while at the same time concentrating the protein component.

The adjustment of pH to form fibers from the xanthan gum - protein mixture may be carried out in a variety of ways. In this regard, the protein fiber generating solution may be provided at a pH significantly above the isoelectric point of the protein complex fibers, and subsequently reduced in pH toward its isoelectric point. This pH reduction may be carried out for example by removal of a cationic counterion (e.g., Na+) of the solubilized xanthan gum and/or protein component as by electrophoresis, or by addition of an edible or food grade acid, such as hydrochloric acid, phosphoric acid, acetic acid, citric acid, ascorbic acid, carbonic acid or mixtures thereof. Adjustment of pH may also be carried out by other appropriate techniques such as by combining an aqueous solution of the protein component at a predetermined pH at which the protein component is solubilized, with an aqueous solution of the xanthan gum component at a predetermined pH at which it is solubilized, such that upon combination, the resulting solution has a predetermined pH at or near the isoelectric point of a desired protein-xanthan gum fibrous complex. The fibrous complex reaction is completed or maximized when the gum-protein mixture is adjusted to a pH at which the electrophoretic mobility of a desired gum-protein mixture is substantially zero.

The isoelectric points of the specified protein component and the xanthan gum component may have widely different values, for example, the isoelectric point of a soy protein isolate component may typically be about pH 4.4., while xanthan gum, because it may have substantially only pendant anionic carboxylic acid ionic species, has an effective negative charge even at pH 1. Soy protein isolate-xanthan fibrous complexes will have intermediate isoelectric points, depending upon the relative proportions of each in the complex. Desirably, the isoelectric point of the protein-xanthan gum complex fibers may approximate the pH of the acid food dressing vehicle and will be in the range of from about pH 3 to about 4.1.

The shape and size of the gum-protein fibers may be controlled by the degree of shear or mixing applied to the fiber forming solution during pH adjustment, and the rate of pH adjustment. The texture of the gum-protein complex may be controlled by varying the weight ratio of the xanthan gum component to the protein component. As indicated, a desired xanthan gum to protein weight ratio is within the range between 1:4 and 1:10. Percentages given herein are weight percentages, and ratios are weight to weight ratios unless otherwise indicated.

The ionic strength of the fiber-forming solution is a very important parameter in respect to fiber formation, and in this regard, should be less than about 1 M, and preferably should be in the range of from about 0 M to about 0.1 M. In many cases it is difficult to calculate the ionic strength. The difficulty is alleviated by measuring the specific conductance of the solution. The specific conductance of the reaction mixture may desirably be less than about 0.09 mho cm$^{-1}$, and preferably should be in the range of from about 0.0004 to about 0.002 mho per centimeter. The formed fibers may desirably be washed to remove salts, drained, pressed to remove moisture and heat-set in agglomerated or unagglomerated form such as by boiling or otherwise heating the fibers. The fibers may also be blended with a suitable binding agent such as egg albumin, and heat set in agglomerated form. Of course, flavoring agets may also be incorporated in or blended with the fiber composition.

Figures 1, 4:
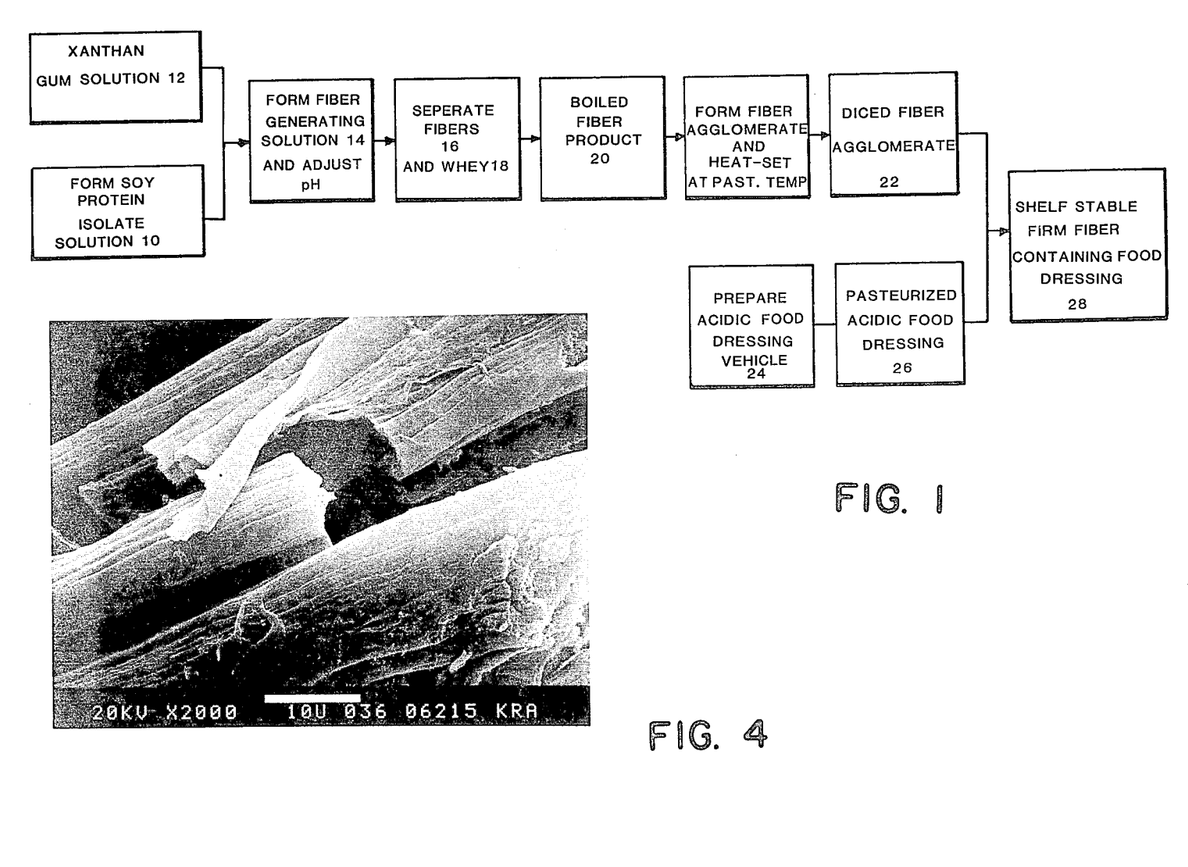
FIG. 1 is a schematic diagram illustrating an embodiment of a method for manufacturing an acid, shelf stable food dressing composition.
FIG. 4 is a scanning electron micrograph, at a magnification of 2000 X, of an embodiment of a fibrous xanthan gum, whey and egg white protein complex which has been in storage testing for approximately two months as a component of an acidic food dressing in accordance with the present invention.

Having generally described protein fiber manufacture, various aspects of the invention will be further described with respect to methods illustrated in FIG. 1. As shown in FIG. 1, an aqueous protein solution such as a soy protein isolate solution 10 may be prepared from a commercially available soy protein isolate at a level of 3.6 weight percent, and having a solution pH of about 7.0. Similarly, a xanthan gum solution 12 may be prepared by dissolving Keltrol xanthan gum, a product of Kelco, Inc. at a level of about 0.6 weight percent. The solutions 10, 12 may be combined in desired ratio to provide a fiber generating solution 14 having about 2 weight percent total solids and a pH of about 6.6.

The pH, ionic strength, gum/protein ratio, percent total solids, temperature, mode of mixing and stirring and rate of acidification are important factors for synthesizing fibers of xanthan gum-protein complexes, utilizing the fiber generating solution 14. Such pH adjustment may be carried out by addition of a suitable acid such as hydrochloric acid to neutralize in part the carboxylates of the protein and the gum so that the repulsion between the two polymers can be minimized. Then, electrostatic interaction and other bondings such as hydrogen bonding, hydrophobic bonding and van der Waals' forces between the two polymers can take place to provide fibers 16 and a whey phase 18 which may be separated by appropriate means.

The temperature of the protein-gum interaction as carried out is also important. A high temperature is not generally desired for forming the fibers of the xanthan gum-soy protein complex. Softer and finer fibers may be obtained when the gum and the protein are heated to or above 70° C. before the two polymers were mixed and acidified.

The rate of acidification of the fiber-forming solution together with the rate of application of shear is a further important factor affecting fiber formation. In this regard, a relatively slow rate of acidification of the mixture of xanthan gum and soy protein may be used for generating fibers. Addition of all the required amounts of acid into the gum-protein mixture at once may produce gummy or slimy fibers. However, it has been found that substantially all of the acidifying agent may be added to the fiber forming solution, and permitted to diffuse under relatively quiescent conditions (e.g., for about a minute), followed by stirring to produce fibers. The whey 18 separated from the fiber composition 16 may contain inorganic salts resulting from the pH adjustment step, and may contain some unreacted xanthan gum or other components. The inorganic salts and other undesired components (if any) may be removed, at least in part, to provide a deionized whey, which may be utilized in a recyclic manner in the provision of the protein and gum solutions 10, 12. The fiber composition may be boiled to provide a product 20 which has a distinct fibrous character. The boiled fibrous product 20 may be blended and agglomerated with a suitable binding agent such as egg whites, heat-set at a pasteurization temperature and diced to provide a diced fiber agglomerate 22.

An acidic food dressing vehicle 24 may be prepared in accordance with conventional practice, and may, if desired be pasteurized to provide a pasteurized dressing 26. The dressing vehicle 26 and the diced fiber agglomerate 22 may be blended to provide a shelf-stable, firm fiber containing food dressing 28.

Although the method of FIG. 1 has been particularly described with respect to soy protein-xanthan gum complex fibers, other water soluble proteins may also be utilized to form meat-like fibers. In this regard, for example, casein such as provided by skim milk powder or as sodium caseinate, other vegetable proteins such as peanut protein isolate, and egg albumin such as provided by egg whites, may be utilized as the solubilized protein component to form fibrous hybrid protein complexes which are relatively bland but differ in color and texture. Casein-xanthan fibers are white and tough while peanut protein isolate and soy protein-xanthan gum fibers are somewhat softer. The ratio of different protein components may be varied to provide fibrous products having a corresponding variety of characteristics.

Upon formation, the complexed gum-protein fibers may be readily separated from the remaining aqueous phase component in any suitable manner, as by filtration or centrifugation. For example, such fibers may be harvested by separating them from the aqueous phase, washing them with water, and pressing them in a cheese-press to provide meat-like fibers that contain generally from about 65 to about 80 weight percent moisture, and typically about 65 percent by weight moisture. The incorporation of additional components such as edible oil emulsion in the fiber forming solution may increase the solids content and correspondingly reduce the total water content. The press dried fibers may be flavored by immersing them in a suitable favoring agent such as lobster, crab, chicken, shrimp, pork or beef extracts or artificial flavors to obtain desired, chewable meat-like products having meat simulating flavor and texture.

Heat treatment of the protein gum-complex fibers, particularly at or near their isoelectric point, may significantly increase (e.g., double) the firmness of the fibers and further results in stabilization of the fibers to retain their firmness.

The moisture content of the drain-dried fibers will generally be in the range of 75 to about 90 percent. However, the fibers, as precipitated, or after heat stabilization may be substantially reduced in moisture content to provide a low moisture fiber product which retains its fiber integrity.

The moisture content of pressed fibers will generally be in the range of from 60 to about 75 percent, although the presence of fats, oils and/or carbohydrates may affect overall moisture content. The time and pressure of pressing can be varied depending upon the firmness and water-holding activity of the fibers and upon the moisture content desired in the finished products. As previously discussed, drain-dried fibers may normally hold a substantial amount of water (e.g., about 80 percent by weight) which may function to dissolve the flavoring agents and which may also function to hydrate a binding agent such as dried egg whites. Nevertheless, some of the flavoring agents and/or the binder may be squeezed out of the fibers upon pressing. In order to minimize the loss of the flavoring agent and the binder, the fibers may desirably be dehydrated, to a certain extent, by centrifugation before flavoring. The amount of water expelled from the fibers may be regulated by varying the speed and time of centrifugation.

The flavored and pressed fiber agglomerates may be heat-set by raising the temperature of the blended fiber and binder mixture to, for example, the boiling temperature of water in the blend. Such heating may be accomplished by means of conventional hot air, thermal radiation, conduction or microwave ovens.

The heat set fiber agglomerates may be cut into suitable sized pieces for the food dressing composition, or the fiber agglomerates may be originally heat set in the form of pieces of desired size.

The food dressing vehicle and the xanthan-protein fiber complex composition component may be combined in any suitable manner to form compositions in accordance with the present invention. Both the dressing vehicle and the fiber composition may be desirably heated, if desired, to a pasteurization temperature of at least about 75° C. at a pH of less than 4.1, and combined under aseptic conditions. However, the heat-set fibers may be combined with various dressing vehicles, without pasteurization of the vehicle or the blend, to provide a shelf-stable dressing product.

Having generally described the invention, various additional aspects will be presented by the following examples.

EXAMPLE 1

Preparation of Xanthan-Protein Fibers

Twenty-five grams of soy protein isolate prepared in a conventional manner without processing aids is suspended in 2800 milliliters of distilled water in a blender. Twenty-five grams of dried egg whites are thoroughly dispersed in the soy protein suspension. To the aqueous soy/egg white blend is added 8.33 grams of food grade xanthan gum, which is thoroughly mixed therewith. The xanthan-soy-egg white slurry formed thereby is acidified with 35 milliliters of one molar hydrochloric acid, with stirring, to generate xanthan-protein fibers. The fibers are permitted to synerese for 20 minutes, after which they are collected, placed on a screen and washed with 8 liters of cold tap water. The washed, drain dried fibers are subsequently boiled in 2 liters of water for 5 minutes. The boiled, washed fibers are collected, boiled with 4 liters of cold tap water and drain dried to produce 322 grams of drain dried boiled fibers. Water is squeezed from the fibers, and a portion of the fibers are placed into a conventional acidic, fluid 1000 Island salad dressing having a pH of 3.5. The fibers are found to retain a very good, chewy texture despite the low pH, and to derive a desirable flavor from the flavor of the salad dressing. Importantly, the fibers are observed to remain very firm even after storage in the salad dressing overnight in a refrigerator.

EXAMPLE 2

Preparation of Xanthan Protein Fibers

Fifteen batches of xanthan-soy protein isolate protein blends are prepared in the manner of Example 1 and combined. Approximately 2.8 liter aliquots of the combined slurry are individually acidified with 35 milliliters of one molar hydrochloric acid to produce xanthan-protein fibers. The resulting fibers are collected from each of the 15 preparations and are combined, washed and boiled for 5 minutes to heat set the fibers. The boiled fibers were immediately washed with cold tap water and dried to provide 4.5 Kg of boiled, washed and drain dried fibers of xanthan-soy protein-albumin (1:3:3) complex fibers. A portion of the boiled, washed and drain dried fibers (designated herein as "fiber product no. 1") was retained for use in acidic salad dressing vehicles.

A portion of the boiled, washed and drain dried fiber was blended with 5 percent, based on the fiber weight, of dried egg white powder. The blended, unflavored fibers were pressed in a tofu frame cheese press and the pressed slab was heated to heat-set the fiber matrix to provide an unflavor fiber agglomerate (designated herein as "fiber product no. 2").

A second portion of the boiled, washed and drain dried fibers was blended with 5 percent of dried egg white powder and 5 percent of a commercially available chicken flavor (Haarmann & Reimer's Chicken Flavor R-6598). The flavored fibers were pressed in a tofu frame cheese press and the resulting pressed slab was heated to heat-set the fiber matrix to provide a chicken flavored fiber agglomerate (designated herein as "fiber product no. 3").

Xanthan-protein fibers are prepared in a manner substantially the same as that described in Example 1, except that in each run, the protein source utilized consisted of 30 grams of dried egg whites and 20 grams of whey protein concentrate. The xanthan utilized for each batch was 8.33 grams. The fibers from 10 batch preparations were collected, washed on a screen with cold water and heat set by being introduced into boiling water for 10 minutes. The boiled fibers were washed with cold water, and dewatered by pressing. 750 grams of the dewatered fibers were blended with 37.5 grams of spray dried egg whites and 22.5 grams of soybean oil. The blend was pressed for 2 hours at 40 psi, removed and cut into ½ inch strips which were heat set in a microwave oven. A portion of the pressed, heat-set fibers was saved for mechanical testing ("shrimp control sample").

The protein fiber strips were dried, and mixed with canthaxanthin powder and microwaved to fix the color. The chunks were washed with both hot and cold water to remove a portion of the color, to provide a fiber agglomerate piece which simulates the texture and appearance of shrimp.

(EXAMPLE 3

Preparation of Acidic Food Dressing Vehicle

Ten pounds of an oil free Italian dressing vehicle are prepared having the following formulation:

| Oil Free Italian Dressing | |
|---|---|
| Ingredients | Weight Percent |
| Water | 84.717 |
| 120 grams Vinegar | 5.450 |
| Salt | 3.767 |
| Sugar | 3.600 |
| Gum Mix | 0.48 |
| Phosphoric Acid | 0.143 |
| Seasonings and flavorings | 0.1793 |

After emulsification, the vehicle had a viscosity of 3900 centipoise at 80° F.

The gums and sugar are blended, dissolved in water. The acidic components are added to the gum/sugar mixture followed by the salt and remaining components. The product had an immediate viscosity of 920 centipoise and an acid content of 0.88 weight percent total acidity, calculated as acetic acid.

Ten pounds of a creamy buttermilk dressing vehicle were also prepared having the following formulation:

| Creamy Buttermilk Dressing | |
|---|---|
| Ingredients | Weight Percent |
| Soybean Oil | 52.600 |
| Water | 9.721 |
| Sugar | 2.000 |
| Lactic Acid 88% | 0.850 |
| Cultured dairy products | 29.500 |
| Salt | 1.700 |
| Gums, stabilizers and preservatives | 1.729 |
| Seasonings and flavorings | 1.900 |

The gums and stabilizers are slurried with a portion of the soybean oil. Cultured dairy products, sugar and flavoring agents are added and the mixture is heated to 175° F. to pasteurize the mixture. The pasteurized mixture is combined with cold water and oil slurry and the remaining ingredients are combined and homogenized to provide a dressing vehicle having a viscosity of 4600 centipoise and an acid content of 0.71, as previously described.

Ten pounds of a creamy shrimp emulsified oil dressing vehicle were prepared in a manner similar to the preparation of the Buttermilk dressing vehicle, having the following composition:

| Ingredients | Weight Percent |
|---|---|
| Soybean Oil | 48.0 |
| Water | 33.94 |
| Cultured dairy product | 9.0 |
| Sugar | 4.55 |
| Salt | 1.50 |
| Lactic Acid | 0.70 |
| Gums, stabilizers and preservatives | 0.837 |
| Seasonings and flavorings | 1.47 |

EXAMPLE 4

Preparation of Stable Xanthan

Protein Fiber Complex Food Dressings

A food dressing (designated herein as "Food Dressing No. 1") is prepared by blending the oil free Italian dressing vehicle of Example 3 with 4 percent by weight, based on the total weight of the dressing mixture of small chicken flavored cubes (Xanthan-protein fiber product no. 3 of Example 2) cut to have a side dimension of approximately ⅛ inch.

Another food dressing (designated herein as "Dressing No. 2") is prepared by combining the oil free Italian dressing vehicle of Example 3 with 1 percent of unflavored fibers (Xanthan-Protein fiber product no. 2 of Example 2), based on the total weight of the dressing.

A third food dressing (designated herein as "Dressing No. 3") was prepared by combining 92 percent by weight buttermilk dressing vehicle of Example No. 3 with 8 percent by weight of chicken flavored chunks (xanthan-protein fiber product No. 3 of Example 2) based on the total weight of the dressing. The chunks were cut to be variable in size ranging from = inch to ¼ inch in side length.

A fourth dressing (designated herein as "Dressing No. 4") was prepared by combining 94 weight percent buttermilk dressing vehicle of Example No. 3 with two weight percent of chicken flavor, and four weight percent of unflavored chunks (fiber product no. 2 of Example 2) based on the weight of the dressing vehicle.

Another dressing (designated herein as Dressing No. 5") is also prepared by combining a conventional taco flavor dressing vehicle with 4 percent by weight based on the total weight of the taco flavored dressing, of unflavored xanthan-protein cubes having a side dimension of ¼ inch (Xanthan-protein fiber product no. 2 of Example 2).

A sixth dressing (designated herein as Dressing No. 6") is prepared by mixing 3 weight percent unpressed fibers (fiber product No. 1 of Example 2) with a 97 weight percent conventional cocktail sauce vehicle, based on the total weight of the resulting dressing. The fiber product, which gives the appearance of crabmeat in the cocktail sauce. The fibers take up the flavor of the cocktail sauce.

Similarly, another dressing (designated herein s Dressing No. 7") is also prepared by mixing 4 weight percent of relatively large unflavored chunks or cubes (fiber product no. 2 of Example 2) having a side dimension of approximately ⅜ inch with 96 percent of a conventional sweet and sour sauce vehicle, based on the total weight of the dressing.

The food dressings containing the xanthan-protein fibers were evaluated as attractive and were found to have good texture, and consistency together with well balanced flavor profiles. It was noted that while unflavored fibers seem to acquire the flavor of the dressing vehicle, distinct flavors were retained by those containing a flavoring agent.

The dressings were stored in a refrigerator for approximately 12 months (363 days) at 38° F. and were periodically examined for biological stability and stability of the protein fiber component. After 12 months of storage, the pH of each of the dressings is measured as presented in the following table:

| Sample | pH |
|---|---|
| Dressing No. 1 | |
| Oil-free italian w/4% small chicken flavored chunks | 3.05 |
| Dressing No. 2 | |
| Oil-free italian w/1% unflavored fibers | 2.65 |
| Dressing No. 3 | |
| Buttermilk dressing with 8% Chicken flavored chunks | 3.58 |
| Dressing No. 4 | |
| 2% Chicken flavor in dressings & 4% unflavored chunks | 3.93 |
| Dressing No. 5 | |
| RC Taco dressing with 4% unflavored chunks | 3.52 |
| Dressing No. 6 | |
| Cocktail sauce with 3% unflavored fibers | 3.62 |
| Dressing No. 7 | |
| Sweet and Sour sauces w/4% large chunks | 3.22 |

Dressings 1, 2 and 7 are tasted after the 12 month storage testing period and were determined to have good texture or very good texture. Dressings 1 and 5 contained suficient fiber material for textural evaluation, and accordingly, the fiber chunks were removed from the respective dressings and washed to remove adhering dressing material. The samples were allowed to air dry for about 1-1½ hours and were subjected to mechanical textural evaluation, as will be descibed hereinafter.

An additional food dressing (designated herein as "Dressing No. 8") is prepared by mixing the shrimp dresing vehicle of Example 3 with the shrimp analog chunks described in Example 2, to provide a shrimp analog dressing having a composition of 93.5% of the dressing vehicle, 4.0% of the shrimp analog protein complex, 0.25% chopped onion and 0.40% dehydrated celery. The dressing product is tasted at the time of formulation and is found to have textural properties similar to a control sample made from freeze dried shrimp. The dressing product is stored for approximately 2 months at a temperature of 38° F. After two month storage, the product is tasted and is found to have a good texture. The pH after 2 months storage is 3.35. Portions of the fiber chunks are removed from the dressing and washed as previously described, for physical textural evaluation.

As described, the xanthan-protein complex fibers in the form of compressed diced cubes and free fibers were incorporated into a variety of salad dressing mixtures and underwent shelf stability testing. The ability of the fibers to maintain a firm bodied structural integrity in the low pH environment of the salad dressings was determined both by subjective taste tests and by physiocochemical instrumental analysis.

Samples were extruded from a cylindrical extrusion cell having a bore diameter of 12.5 mm, a stroke of 75 mm, through a cylindrical extrusion orifice having a length of 6 mm and a diameter of 1.5 mm, using an Instron Universal Testing Machine Model #1122. A cross head speed of 50 mm/min was used to extrude the samples. The average maximum force developed at 45° F. was used as a measure of structural firmness of the samples. Fiber chunks were extracted from dressings after aging, as previously described. Control unaged product was also measured in two instances. The following results show that product after aging still retained good structural integrity.

| Fiber Chunks in Dressing No. | Dressing Vehicle | pH | Age | Avg. Máximum Force |
|---|---|---|---|---|
| 1 | OF Italian | 3.05 | 12 mo. | 167 ± 2 kg |
| 5 | RC Taco | 3.52 | 12 mo. | 109 ± 1 kg |
| 8 | Shrimp | 3.35 | 2 mo. | 88.3 ± 3 kg |
| Shrimp Control - Example 2 | | | | 51.3 ± 4.5 kg |

Figure 2:
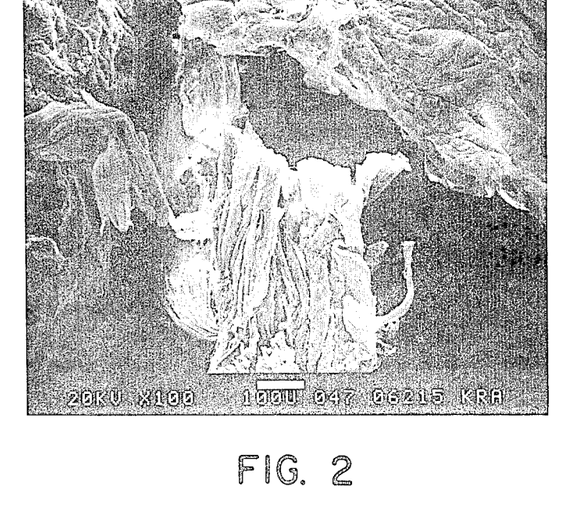
FIG. 2 is a scanning electron micrograph, at a magnification of 100 X, of an embodiment of a fibrous xanthan gum - soy and protein isolate complex which has been in storage testing for approximately 12 months as a component of an acidic food dressing composition in accordance with the present invention.
Figure 3:
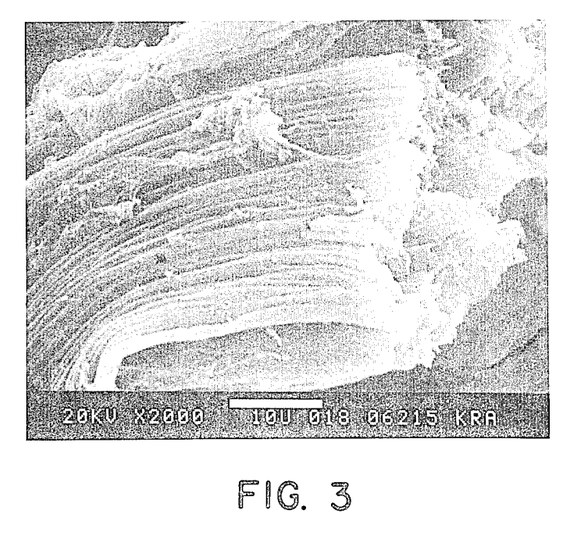
FIG. 3 is a scanning electron micrograph, at a magnification of 2000 X, of an embodiment of a fibrous xanthan gum, soy protein and whey protein complex which has been in storage testing for approximately 12 months as a component of an acidic food dressing composition in accordance with the present invention.

The xanthan-protein complex fibers were examined by Scanning Electron Microscopy (SEM) both before and after aging in low pH salad dressing systems. FIG. 2 is a SEM micrograph of a portion of the fiber product extruded from dressing no. 1 after the 12 month storage period at a magnification of 100. FIG. 3 is a SEM micrograph of the fiber product extracted from dressing no. 5 after the 12 month storage period at a magnification of 2000. FIG. 4 is a SEM micrograph of the fiber removed from dressing no. 8 after the 2 month storage period, at a magnification of 200. The results displayed in FIGS. 2-4 show that the fibrous nature of the material is retained even after up to 12 months at low pH.

Accordingly, it will be appreciated that in accordance with the present invention, shelf-stable acidic food dressings are provided which comprise fibrous, meat simulating protein compositions. While the present invention has been described with respect to various embodiments, it will be appreciated that various modifications and adaptations may be made based on the present disclosure, which are regarded to be within the spirit and scope of the present invention.

Various of the features of the invention are set forth in the following claims.

What is claimed is:

1. A shelf-stable acidic food dressing comprising a blend of from about 50 percent by weight to about 99.75 percent by weight of an acidic, aqueous food dressing vehicle having a pH of less than about 4.1 and from about 0.25 to about 50 percent by weight of a firm-bodied xanthan gum-protein fiber complex.

2. A shelf-stable acidic food dressing in accordance with claim 1 wherein said xanthan gum-protein fiber complex is a fibrous heat-set complex of xanthan gum and a protein or protein mixture having an isoelectric point of at least pH 3.

3. A shelf-stable acidic food dressing in accordance with claim 2 wherein said dressing vehicle has a pH in the range of from about 2.75 to about 3.75 and wherein said xanthan gum-protein fiber complex comprises from about 20 to about 80 percent water and from about 5 to about 75 percent complexed xanthan gum and protein.

4. A shelf-stable food dressing in accordance with claim 1 wherein, said xanthan-protein complex is in the form of shrimp or chicken fiber agglomerates having a mass of less than about 2 grams.

5. A shelf-stable food dressing in accordance with claim 1 wherein said fibrous xanthan-protein complex has an isoelectric point of less than about 4.1.

6. A method for preparing a shelf-stable food dressing comprising the steps of preparing a xanthan-protein fibrous complex, preparing an aqueous, acidic food dressing and combining the food dressing and the xanthan-protein fibrous complex to provide a shelf-stable aqueous food dressing containing meat simulating fibers which retain their textures under prolonged storage at acid pH of less than 4.1

* * * * *